(12) United States Patent
Bunkers et al.

(10) Patent No.: US 6,472,001 B1
(45) Date of Patent: Oct. 29, 2002

(54) SYSTEM FOR CONTINUOUSLY FORMING CENTER FILLED GUM

(76) Inventors: Joseph M. Bunkers, 8767 Carradale Dr., Caledonia, IL (US) 61011; James Duggan, 514 Otto Rd., Machesney Park, IL (US) 61115

( * ) Notice: Subject to any disclaimer, the term of this patent is extended or adjusted under 35 U.S.C. 154(b) by 38 days.

(21) Appl. No.: 09/656,820

(22) Filed: Sep. 7, 2000

(51) Int. Cl.[7] .............................. A23G 3/30; A23P 1/12
(52) U.S. Cl. ........................ 426/5; 426/389; 426/517; 426/518; 426/524; 425/236; 425/237; 425/362; 425/365; 425/407; 425/408; 425/437
(58) Field of Search ................................ 426/3, 5, 517, 426/389, 512, 518, 524; 425/235–237, 362, 365, 406–408, 437, 444; 264/159, 163

(56) References Cited

U.S. PATENT DOCUMENTS

| | | |
|---|---|---|
| 3,806,290 A | 4/1974 | Graff et al. |
| 3,857,963 A * | 12/1974 | Graff et al. .................. 426/3 |
| 4,468,185 A * | 8/1984 | Jansen ..................... 425/133.1 |
| 4,847,090 A | 7/1989 | Della Posta |
| 5,141,425 A * | 8/1992 | Bliss et al. ................. 425/193 |
| 5,449,281 A * | 9/1995 | Dupart et al. ............. 425/131.1 |
| 6,284,291 B1 * | 9/2001 | Siecke et al. .................. 426/5 |

FOREIGN PATENT DOCUMENTS

| | | |
|---|---|---|
| GB | 690044 | 4/1953 |
| GB | 2 042 969 A | 10/1980 |
| WO | WO 01 10238 A1 | 2/2001 |

* cited by examiner

*Primary Examiner*—Keith Hendricks
*Assistant Examiner*—Drew Becker

(57) ABSTRACT

Method and system for continuously producing pieces of liquid-filled gum material. An extruded rope of liquid-filed gum is sized and separated into individual pieces of gum. A rotating drum mechanism having a die ring and cutter ring with mating die members separate the rope of gum material into individual pieces. Pairs of cam-operated plunger members compress and form the pieces of gum material in the die cavities. Angled grooves in the die members prevent portions of the gum pieces from being chipped-off during formation. A feed chute with air assist transfers the gum rope from a sizing table to the rotating drum mechanism. A stripper member insures that the formed pieces of gum material are removed from the drum mechanism. Portions of the drum mechanism are selective heated and cooled. The invention provides a more efficient system for continuous, high production operation.

24 Claims, 7 Drawing Sheets

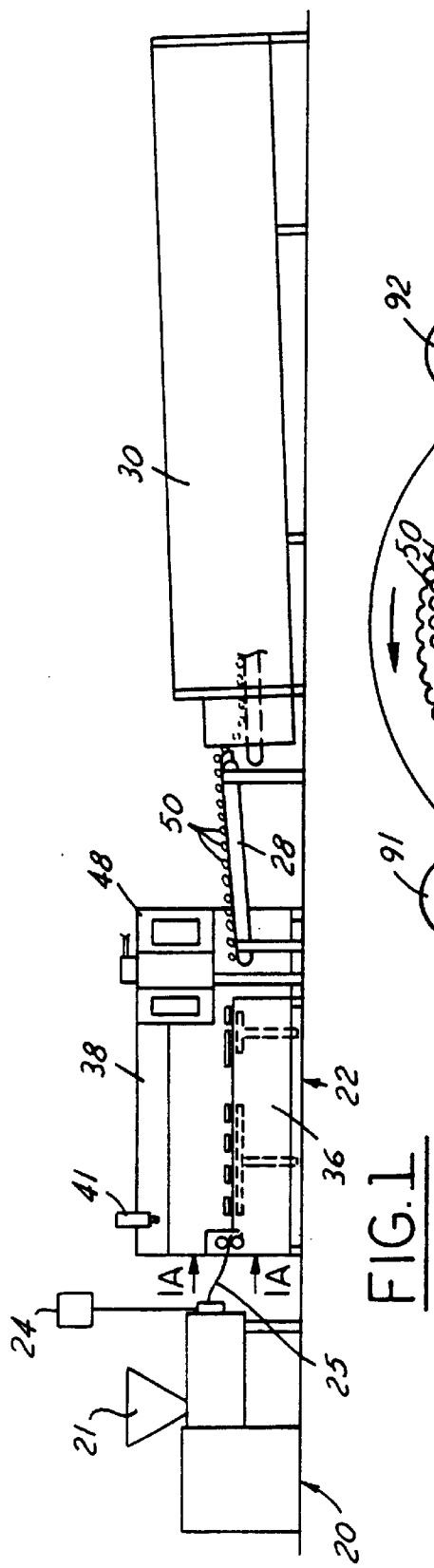
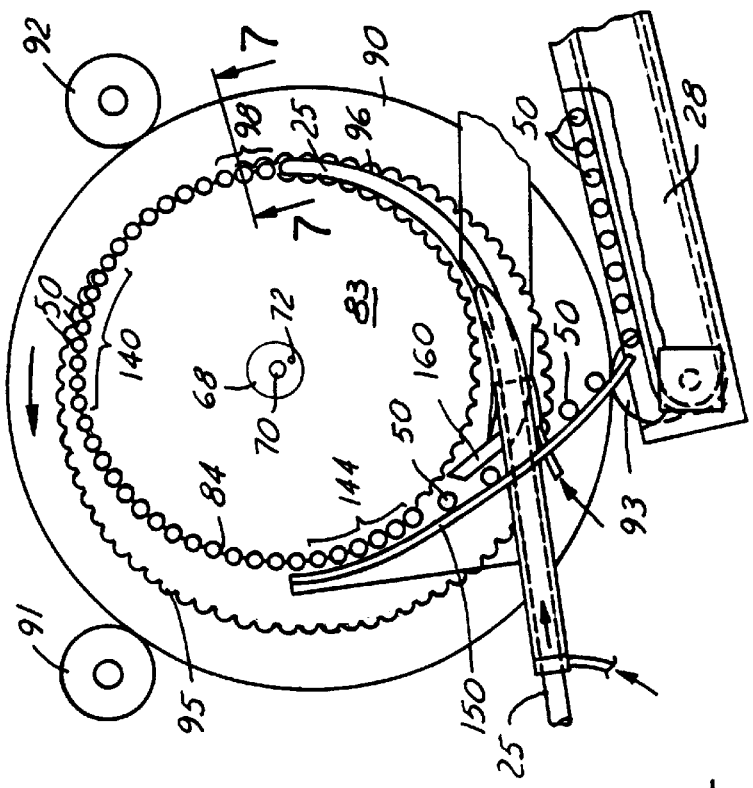
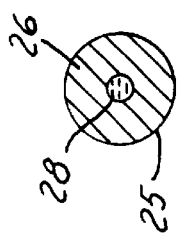
FIG.1
FIG.5
FIG.1A

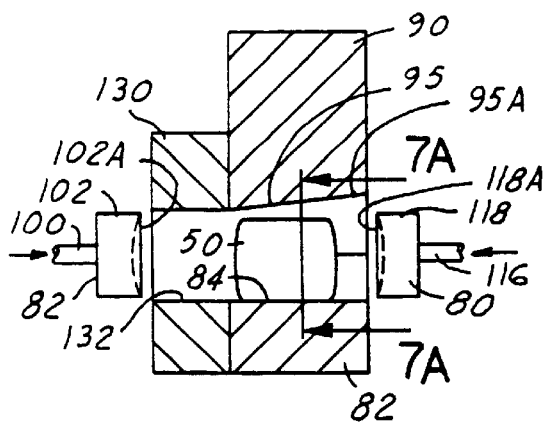
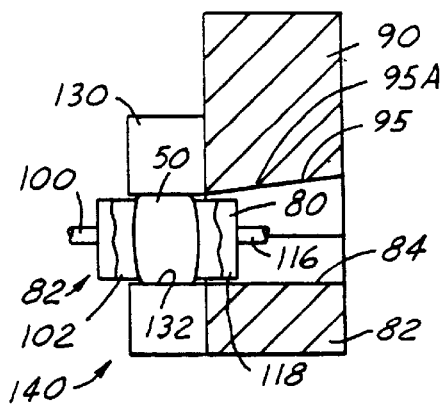
FIG.7  FIG.8
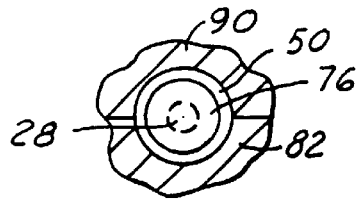
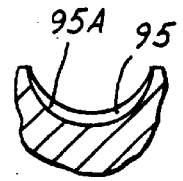
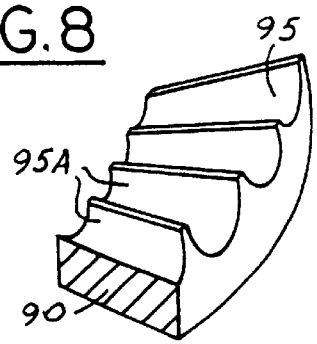
FIG.7A  FIG.9A  FIG.9
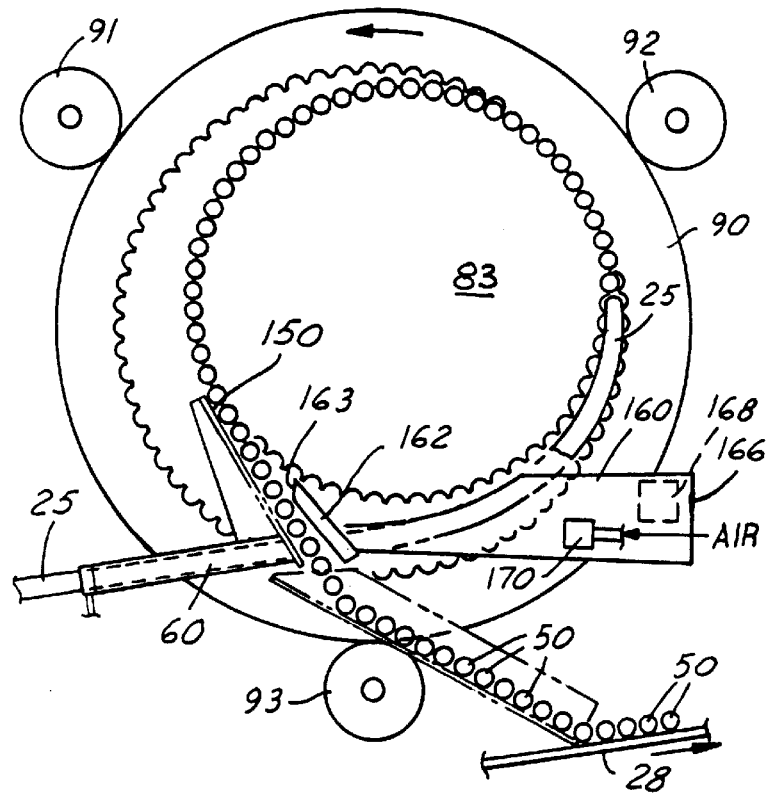
FIG.10

SYSTEM FOR CONTINUOUSLY FORMING CENTER FILLED GUM

TECHNICAL FIELD

Method, system, and apparatus for continuously forming center-filled gum, particularly for continuously forming individual sealed pieces of liquid-filled gum from a continuous rope or strand.

BACKGROUND OF THE INVENTION

Liquid or center filled gum and other confectionery products are in popular demand today. These products have a hard or solid exterior portion or shell and a soft or liquid center. The outer portion can be chewing gum or bubble gum of some type, while the liquid center portion can be a flavored material typically having a syrup-like consistency.

There are numerous mechanisms and systems known today for forming liquid-filled gum and other confectionery products. One of these systems is shown, for example, in U.S. Pat. No. 3,857,963 to Graff et al. Although many of these known mechanisms and processes operate satisfactorily and produce acceptable results, there are a number of mechanical and processing concerns which need improvement. In particular, there is a need for faster, high volume systems as well as systems which are more efficient, easier to operate, and have fewer mechanical breakdowns.

One of the difficulties in the art of gum manufacturing is the fact that the gum products are tacky and have a tendency to stick or adhere to molds and operating machinery. Thus, it is recognized that gum producing mechanisms need to be operated at low temperatures, such as minus one hundred degrees Fahrenheit (−100° F.). At these low temperatures, however, the costs of operation increase and the operation of machinery become more difficult. For example, oils and greases can congeal into non-fluid masses, thereby reducing the lubricating ability of the materials and causing increased friction of moving parts. This also causes additional heat load on the moving parts resulting in less efficient high-speed operation.

It is also necessary with some known low-temperature gum forming operations to cool virtually the entire machinery, including all of the rotating parts. This is particularly true with systems which utilize rotating piece-producing drum members wherein the products are in contact with the drum members virtually the entire circumference of the drum. Cooling in these systems is typically done with super cooled air or gas to provide the necessary low temperatures. Cooling all parts of the apparatus, however, creates significant additional expense, as well as further mechanical and friction difficulties in the operation of the machinery.

It has also been known to be problems with rotating gum forming equipment to effectively feed a rope or strand of gum material into the rotating machinery and to insure that all of the formed pieces of gum material are removed or stripped from the rotating machinery. It is also known that rotating gum forming machinery often "chips" or clips off pieces of the individual gum pieces as they are formed. This creates unnecessary waste of material and, if the material has a liquid portion, can result in "leakers" which can cause stoppage and/or breakdowns of the machinery, as well as undesirable final products.

SUMMARY OF THE INVENTION

It is an object of the present invention to provide an improved mechanism and system for producing center-filled gum products. It is also an object of the present invention to provide an improved system for continuously producing pieces of center-filled gum from a continuous rope or strand of gum material.

It is a further object of the present invention to produce a rotating gum forming mechanism and system which prevents the undesirable removal of small portions of the gum products as they are formed.

It is a still further object of the present invention to provide a continuous gum manufacturing mechanism and system in which it is unnecessary to cool all of the various components of the machinery, and in fact where portions of the machinery can be heated to improve performance. It is another object of the present invention to provide an improved gum manufacturing mechanism and system which produces center-filled gum products on a faster and more efficient basis.

It is still another objection of the present invention to provide a continuous gum forming mechanism and system in which a rope or strand of gum material is fed into the system in a faster and more efficient manner. It is a still further object of the present invention to provide a mechanism to insure removal and/or stripping of formed gum material from a continuous gum forming mechanism and system.

These and other objects are met by the unique and inventive gum forming mechanism and system in accordance with the present invention. The system includes an extrusion and gum forming mechanism with a rotating drum member which produces center-filled gum pieces on a faster, more efficient and less costly basis.

The gum forming mechanism includes a sizing and transport table which conveys a sized rope of gum material to the rotating drum mechanism. The rotating drum mechanism has a rotating die ring and a rotating cutter ring, both with mating die halves which together form a complete mold or die which separates, shapes, and forms the gum pieces. A series of cam-operated plunger members are positioned in the drum mechanism on opposite sides of the die members in order to help shape and form the individual pieces of gum.

The die halve members in the rotating cutter ring have slanted or angled surfaces in order to prevent slicing or chipping of small portions of the gum products as the plunger members form the gum products in the mating dies and transfer them to a matrix ring. Also, an air-assist feed chute is provided which utilizes streams of pressurized air to transfer the gum rope from the sizing table to the rotating drum member. A stripper mechanism is positioned to insure removal of the formed gum products as they are ejected from the dies and matrix ring.

Portions of the gum forming mechanism and system are selectively heated or cooled to improve the efficiency and performance of the machinery and system. The sizing rollers and gum forming dies are cooled by use of a cooled gas. The mechanism which rotates the drum members and operates the cams and plungers members can be heated (or at least not cooled) in order to improve efficiency and performance.

With the present invention, liquid-filled pieces of gum are formed in a faster and more efficient manner than with known processes and systems.

BRIEF DESCRIPTION OF THE DRAWINGS

FIG. 1 schematically illustrates a continuous center-filled gum forming system in accordance with the present invention;

FIG. 1A is a cross-sectional view of the center-filled gum material shown in FIG. 1, the cross-section being taken along lines 1A—1A thereof;

FIG. 5 is a schematic illustration of the rotating die ring and cutter ring in accordance with the present invention;

FIGS. 7 and 8 are schematic partial cross-sectional views showing formation of the gum products in accordance with the present invention;

FIG. 7A is a cross-sectional view taken along lines 7A—7A in FIG. 7;

FIG. 9 is a perspective view of a portion of the cutter ring showing the die halves with slanted wall surfaces;

FIG. 9A is an end view of one of the cutter ring grooves shown in FIG. 9;

FIG. 10 is another schematic illustration of the rotating die ring and cutter ring, along with the stripper mechanism;

BEST MODE(S) FOR CARRYING OUT THE INVENTION

Figure 2:
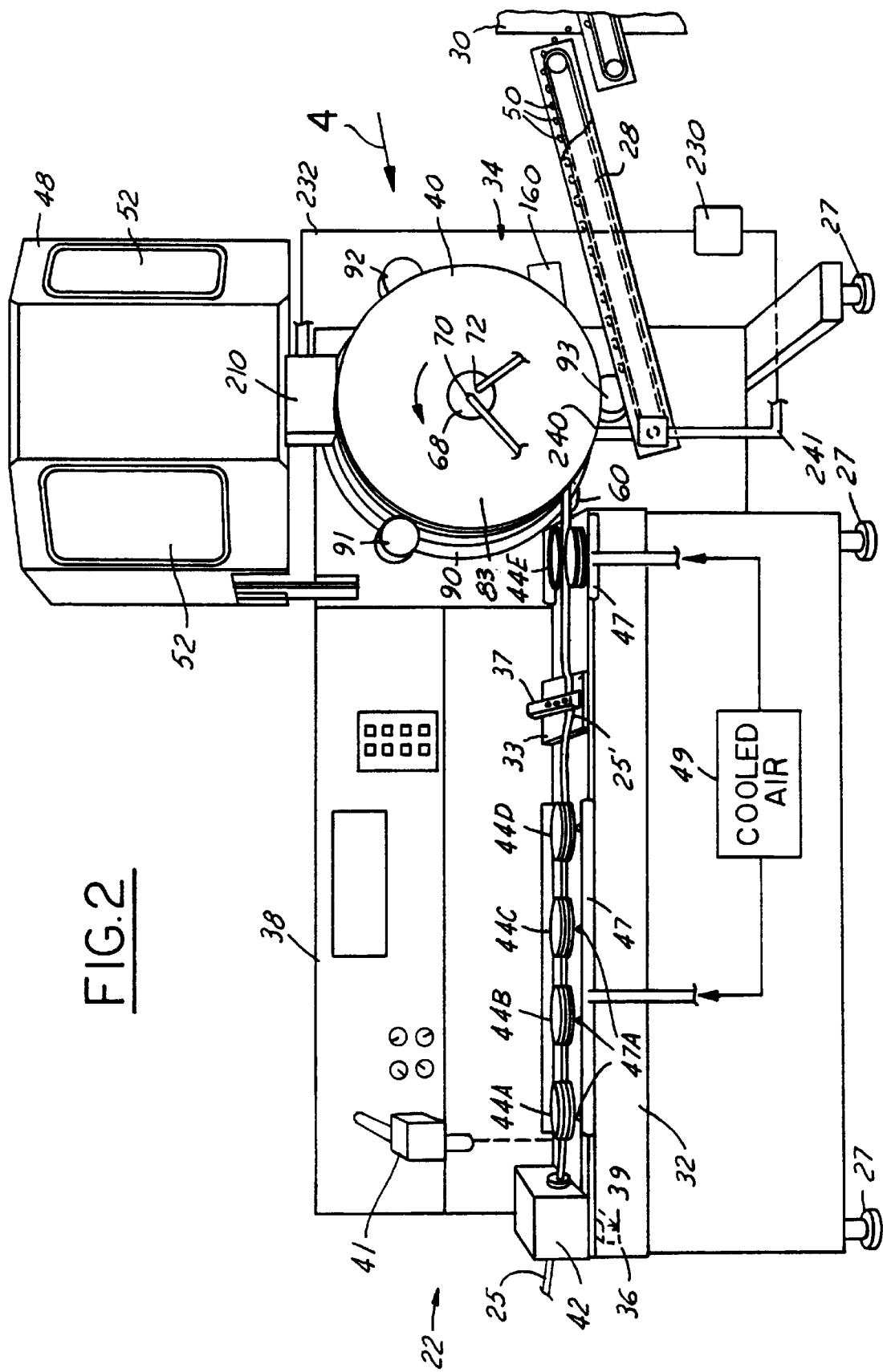
FIG. 2 depicts a gum forming mechanism in accordance with the present invention.

FIG. 1 shows an extrusion machine 20 and a gum forming mechanism 22. The extrusion machine 20 can be of any conventional type and includes a liquid filling mechanism 24. The liquid filling mechanism is utilized to insert a stream of liquid material in the center of the gum 25 as it is being formed and extruded by the extrusion machine. Mechanisms to center-fill gum and other confectionery products are known in the art and no further description is required here.

As shown in FIG. 1A, the gum material 25 is extruded in a continuous rope or strand having a generally circular cross-section. The gum material 25 includes an outer core or shell 26 of chewing gum or bubble gum material and an inner core 28 of a liquid or softer material. In this regard, centers of liquid filled gum products are flavored and typically have a liquid or a syrup-like consistency.

The rope of gum material 25 is conveyed to the gum forming mechanism 22 in any standard manner. If the extruder 20 and forming mechanism 22 are positioned immediately adjacent one another, the strand of rope 25 can simply be directly inserted into the forming mechanism 22 (as shown). A conventional conveyor mechanism (not shown) could also be utilized.

Once the pieces of formed gum material 50 are formed by the forming mechanism 22, they are transported by a conveyor mechanism 28 to a cooling tunnel or mechanism 30.

The formed and cooled pieces of material which exit the cooling mechanism 30 then can be processed in any conventional manner. For example, the products can be fed directly to a packaging mechanism or system where the pieces of material are wrapped and placed into shipping boxes or containers. Alternatively, the products could be transported to a cooled room or staging area for further cooling or storage prior to packaging.

As shown in FIG. 2, the gum forming mechanism 22 comprises a gum transport section 32, together with a piece-forming section 34 consisting of a rotating drum mechanism 40 which continuously forms pieces of liquid-filled gum 50.

Figure 3:
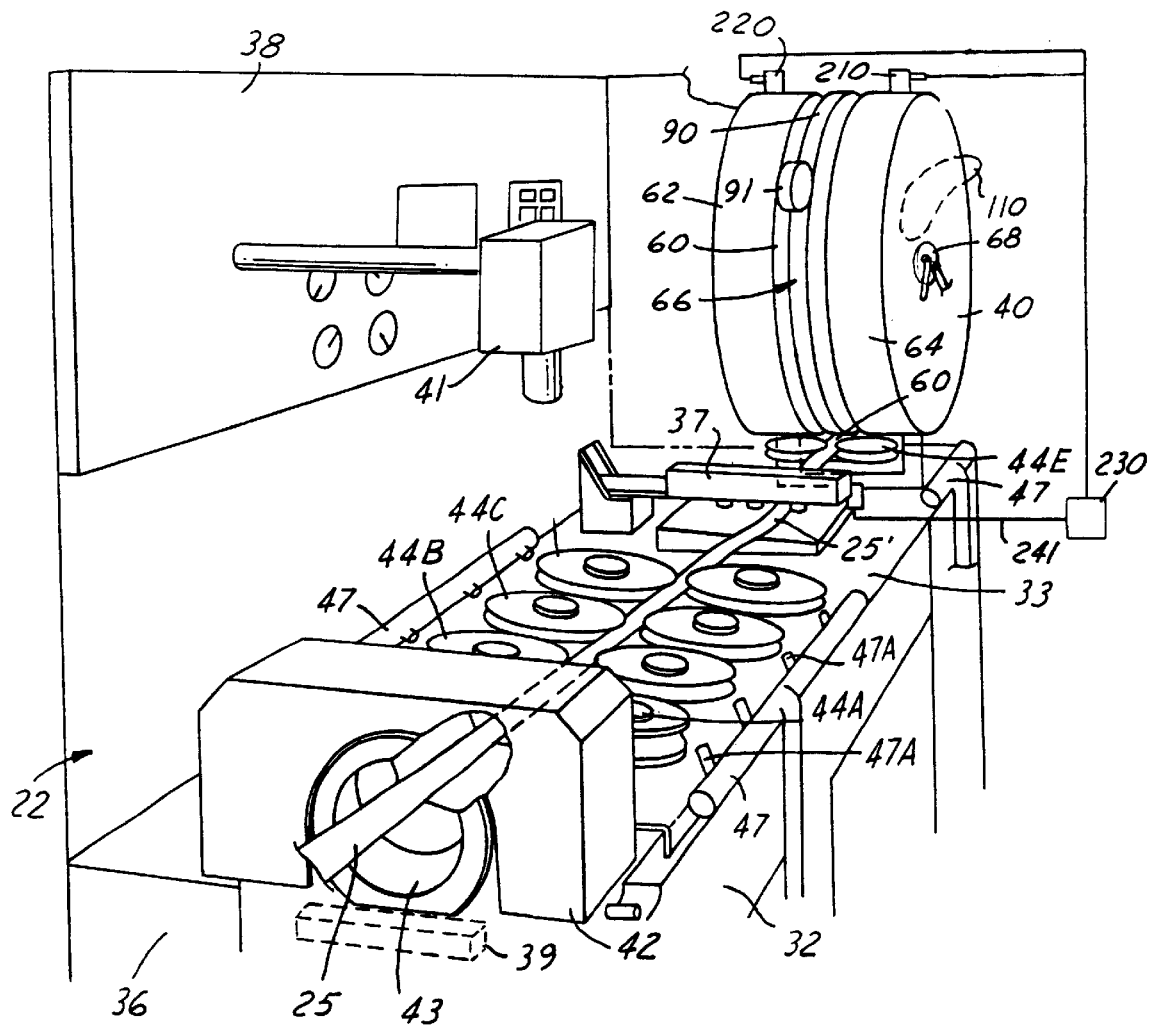
FIG. 3 is an enlarged view up of a portion of the gum forming mechanism in accordance with the present invention.

The gum transport section 32 includes a table member 36 and a control panel 38, as also shown in FIG. 3. The table member 36 has a feeding mechanism 42 positioned at one end and a series of pairs of roller members 44A, 44B, 44C, 44D, and 44E positioned along the surface of the table. The rope of gum material 25 is pulled gently along the table 36, first by the roller members 44A–44E, then by the feed chute member 60 (described below), and then by the rotating drum mechanism 40 once the process is in full operation. The sets or pairs of roller members 44A, 44B, 44C, and 44D assist in sizing and transporting the gum rope 25 along the top of the table member 36. The final set of roller members 44E at the end of section 32 are used to guide the rope of gum material into the feed chute member 60 and the individual piece forming section 34.

The feeding mechanism 42 includes a cone-shaped forming die 43 which reduces the size of the rope 25 from several inches in diameter as it leaves the extruder 20 to a smaller diameter depending on the material as it enters the forming and sizing portion of the table member 36. The forming die 43 can be heated slightly by a heater mechanism 39 in order to maintain it at an appropriate temperature for both squeezing the gum material and at the same time allowing it to pass easily through the die.

A rope thickness sensor 41 is positioned above the table member 36 and directed to measure the size (diameter) of the rope of gum material 25 as it exits the reducing die 43. The sensor can be of any conventional type, but preferably is an ultrasonic sensor. The measurements taken by the sensor 41 are fed into the control panel 38 and the speed of travel of the rope 25 on the table member 36 is adjusted accordingly in order to provide the proper size, diameter and amount of gum material entering the forming dies. The rope of gum material is reduced approximately 50–75% in size (diameter) from the time it is extruded from the extruder 20 to the time it enters the piece forming section 34. For example, a reduction from 4.5 inches to 1.5 inches is typical.

As shown in FIGS. 2 and 3, the rope of gum material is preferably not stretched tightly along the top of the table member 36. Instead, the rope of gum material is conveyed along the transport section 32 at a consistent speed and has a slackened section 25' prior to entering the piece forming section 34.

The slackened portion 25' of the rope material is positioned on an angled platform 33 and constantly measured by a sensor arm 37. The angled platform insures that the curve of the slackened portion 25' is directed in a certain direction (helped by gravity). The sensor arm 37 has a plurality of sensor members which provide an indication of the direction and amount of bend or slack 25' in the gum rope 25. The data read by the sensors is fed into the control panel 38. If the slack in the gum rope is too large or too small, the speed of travel of the gum rope on the table member is adjusted accordingly.

Preferably, the main transport portion of the section 32 is kept at a reduced temperature in order to prevent the gum material from sticking to the roller members. For this purpose, cooled air or gas is directed toward the roller members from tubular members 47 connected to a source of cooled air 49. Tubular members are positioned along both sides of the roller members. Individual nozzles 47A direct cooling air directly at the surface of each roller to maintain it at a prespecified temperature. The temperature of the roller members 44A–44E on the table member 36 is typically maintained below −90° F., although the actual temperature will vary with the material and production rate. In order to control costs of manufacture, the temperature should be just cold enough to support production. If necessary, a housing member (not shown) could be positioned over the roller members in order to help maintain the overall temperatures of the rollers at a prespecified temperature.

The gum forming mechanism 22 is positioned on a series of supports and/or leg members, such as members 27, and also includes a cover or housing member 48 which is adapted to slide over and enclose the rotating drum mechanism 40—both for operator safety and for maintenance of certain operating temperatures of the gum forming mechanisms. Windows 52 in the cover member 48 can be provided to allow the operator to visually inspect the piece forming operation.

Figure 4:
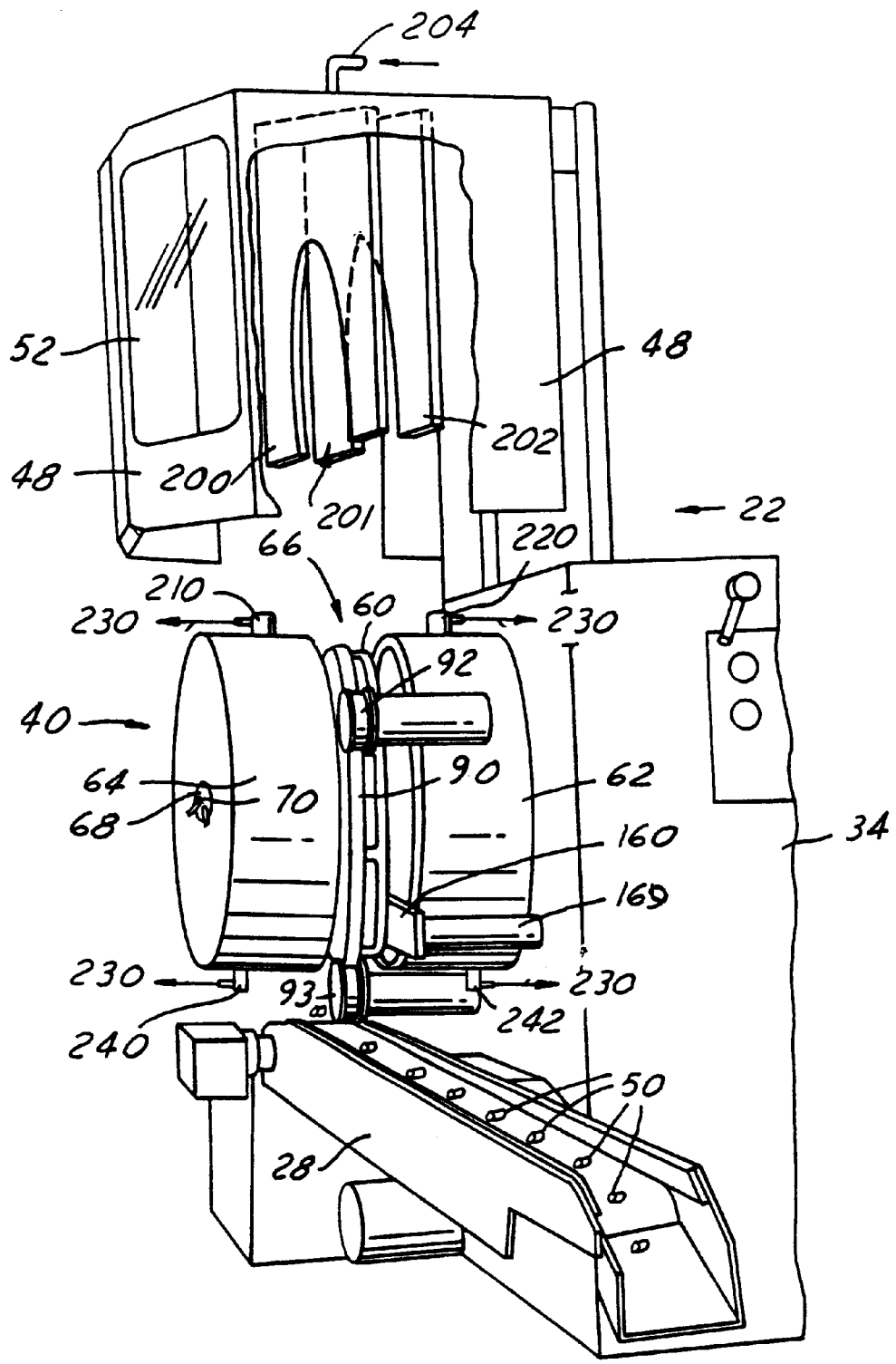
FIG. 4 illustrates another portion of the gum forming mechanism in accordance with the present invention.

The rotating drum mechanism 40 has a rotating drum member 60 positioned in a pair of stationary drum housings 62 and 64 (see FIGS. 3 and 4). Housing member 62 is attached to the gum forming mechanism 22 and encloses a first portion of the rotating drum member 60. The housing member 64 is attached to the end of a stationary shaft member 68 centrally positioned inside the drum member 60. The housing member 64 encloses a second portion of the rotating drum member. A gap 66 is left between the two housing portions 62 and 64. A rotating spindle member (not shown) operated by the gum forming mechanism 22 is positioned around the stationary shaft member and is connected to the drum member 60 and rotates it relative to the housing portions 62 and 64.

In order to increase the life of the bearings and other portions of the rotating spindle member relative to the stationary member and allow the drum member 60 to freely rotate without undesirable friction, a heater member 70, such as a cartridge heater, is positioned inside the stationary spindle member 68 (see FIG. 2). In order to monitor the temperature of the cartridge heater 70, a thermocouple 72 or the like is also positioned in the stationary spindle member 68. For this purpose, elongated channels or passageways are formed longitudinally in the spindle member 68 for positioning of the cartridge heater member 70 and thermocouple 72. The heater member 70 allows the bearings, rotating components and lubrication therefor relative to rotation of the drum member 60 to be kept at an appropriate operating temperature and not be overly cooled which could adversely affect efficiency and output performance. Keeping the operating members at normal operating temperatures also results in less breakdowns and repair of the rotating and moving mechanisms. The components also have increased durability and life, resulting in less tooling, maintenance and repair costs.

Figure 6:
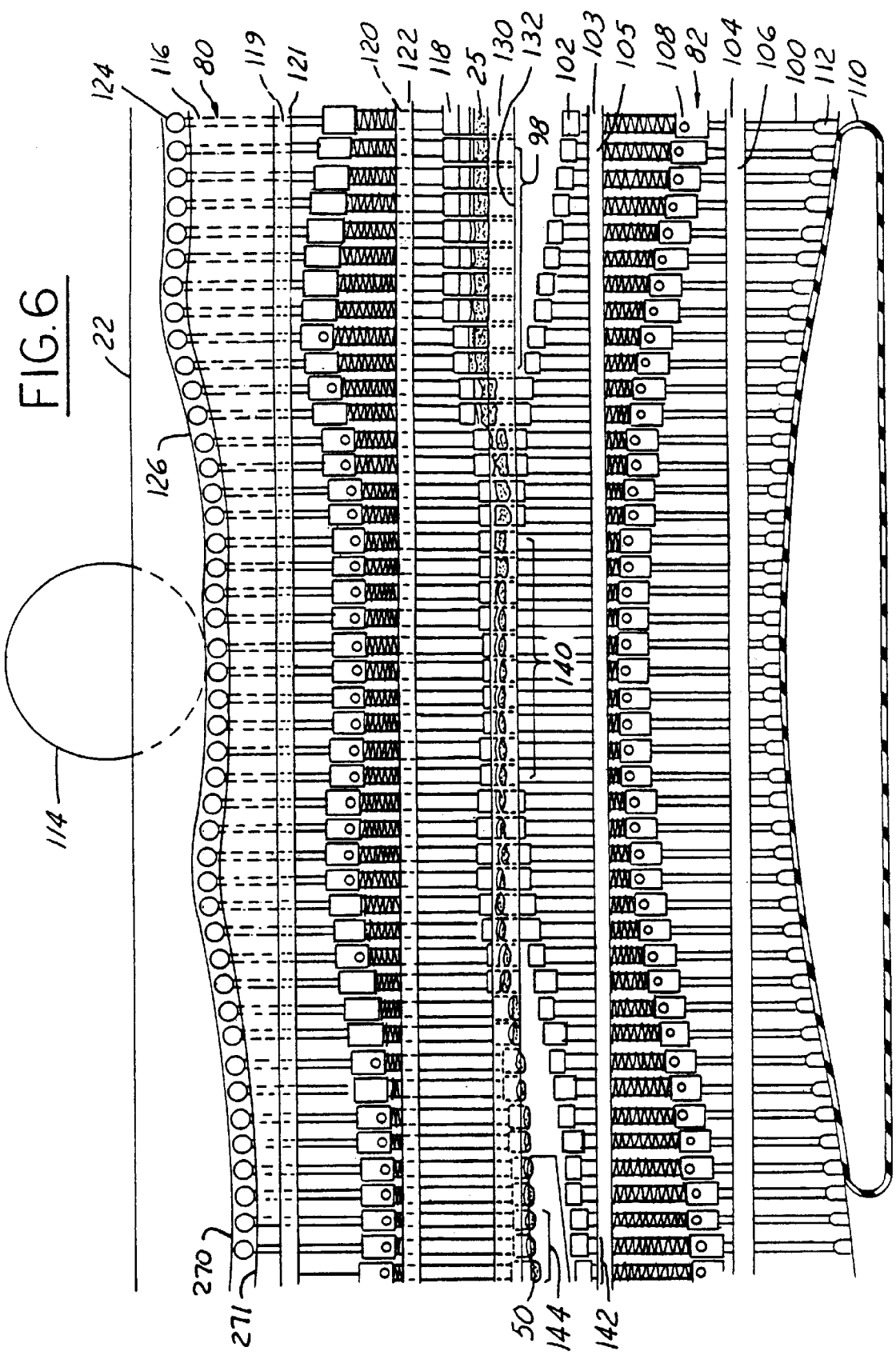
FIG. 6 is an enlarged view of the die groove members and cam-operated plunger members forming pieces of gum material in accordance with the present invention.

The drum member 60 includes a first plurality of cam operated plunger members 80 and a second plurality of cam operated plunger members 82 (see FIG. 6). The plunger members are positioned on opposite sides of a die ring 83 which has a plurality of die halves 84 around its outer periphery. The cam operated plunger members 80 and 82, as well as the die ring 83, have a common center along with the drum member 60 relative to the central shaft member 68.

A cutter ring member 90 is provided on the outside of the die ring 83 and is adapted to rotate in the same direction. The cutter ring member 90 is supported by a three guide rollers 91, 92 and 93 and has a plurality of mating die halve members 95 around its inner periphery. One or more of the guide roller members (e.g. roller member 92) are tensioned in order to hold the cutter ring member in position and to rotate with the die ring member 82 and drum member 60. Once the gum forming system is in operation and the rope of gum material is being pulled and rotated around the rotating die member 60 and die ring member 82, the cutting ring will rotate along with them and at the same speed.

The die halve members 84 on the die ring member 83 and the die halve members 95 on the cutter ring member 90 mate together to form dies or molds for formation of the individual pieces of gum products. As shown in FIG. 5, the rope of gum material 25 is inserted into the converging gap 96 between the die ring and cutter ring and cut into individuals pieces at the area or portion 98 where the two mating semi-circular die groove members come together forming circular dies. Thereafter, the cut pieces of gum material 50 are held in place and compressed by the cam operated plunger members 80 and 82, as described below, as the individual pieces continue their rotation around the die ring member until they are stripped or removed therefrom and fall into a conveyor member 28 for transport to the cooling mechanism 30.

As shown in the drawings, the die halves can have semi-circular grooves resulting in the formation of circular (cylindrical) die molds for similarly shaped product. It is understood, however, that the die halves can have any shape depending on the desired shape of the final products.

The outer ends or tips of the semi-circular die half members 84 and 95 meet or make contact in order to provide and effective mechanism for cutting and separating the rope of gum material into individual pieces. The ends can be tapered in order to provide a minimal or thin line contact between the die members for ease of cutting the gum material.

A schematic view of the plunger members 80 and 82, the die members, and the cam mechanisms used to operate the plunger members, as well as the formation of the individual pieces of gum material, are set forth in FIG. 6. FIG. 6 schematically illustrates the operation of these mechanisms in a planar view for ease of reference.

As shown in FIG. 6, the series of plunger members 82 comprise individual rod members 100 and punch heads 102. The rod members are positioned in corresponding holes or openings 103 and 104 in support rings 105 and 106, respectively. Rider members 108 ensure that the plunger members move longitudinally only within a certain length of travel. The rider members are affixed to rod members 100.

The plunger members 82 are moved longitudinally by a tension mechanism 110, such as an air bladder, which is positioned along the outer surface of the drum member 60 (see FIG. 3). Air pressure within the member 110 can be adjusted, as desired, in order to affect the movement and functioning of the plunger members. In this regard, as shown in FIG. 6, the tension mechanism 110 moves the plunger members 82 longitudinally as the cam members 112 ride along the outer surface of the member 110 in the sequence illustrated.

The operation, movement and structure of the plunger members 80 is similar to plunger members 82, although a conventional pressure roller mechanism is used to operate the longitudinal movement of the plunger members 80. The pressure roller mechanism is schematically shown and referred to by the reference numeral 114. Each of the plunger members 80 includes a elongated rod member 116 and a punch head 118. The rod members 116 are positioned and guided through openings 119 and 120 in support ring members 121 and 122. Each of the plunger members 80 have a cam follower member 124 at its outer end. The cam follower members are positioned in slot 126 formed by outer and inner cams 270 and 271 and operate in conjunction with pressure roller 114. Again, similar to the plunger members 82, the plunger members 80 move longitudinally in the sequence illustrated in FIG. 6.

When FIGS. 5 and 6 are viewed together, the sequential formation of the individual gum pieces 50 from the gum rope 25 is illustrated. As the gum rope 25 enters the cutting section 98 where the die members 84 and 95 come together, the plunger members 80 and 82 are positioned such that the punch heads 102 and 118 are not in contact with the die ring, cutter ring member, or gum material. As the gum material moves along the outer peripheral or circumference of the die ring member and thus from the right to left direction in FIG. 6 (and counter-clockwise in FIG. 5), the plunger members 80 are activated by the outer cam member 270 and act to move the cut-off pieces of gum material from the die members into openings in a matrix ring 130. The matrix ring 130 is attached to the drum member 60 and is positioned immediately alongside the die ring member. The matrix ring 130 has a series of die holes or openings 132 substantially the same shape as the punch heads, as well as the final formed gum process. This structure and sequence of steps is also shown in FIGS. 7 and 8.

The front surfaces 102A and 118A of the punch heads 102 and 118, respectively, have product shapes, such as the concave curved shapes shown in the drawings, in order to form outer surfaces on the pieces of gum material 50. Many shapes could be used and logos added if desired, by changing the shape of the surfaces 102A and 118A.

The half die members 95 in the cutter ring member 90 have slanted surfaces 95A in the longitudinal (axial) direction of the die halves. This is shown in FIGS. 9 and 9A, as well as FIGS. 7 and 8. The slanted surfaces 95A in the die members allows the punch heads 118 of the plunger members 80 to easily and efficiently enter into the die groove members 95, pass entirely therethrough (as shown in FIG. 8), and move the individual pieces of gum material 50 into the openings 132 in the matrix ring 130. The slanted surfaces also allow such process to take place at a higher rate of speed and without undesirable removal of edge/corner portions ("chips" or "slices") of the gum pieces. In this regard, during the piece-forming process, both the die ring member 83 and cutter ring member 90 are rotating with the die groove members 84 and 95 coming together to pinch and cut the rope material into individual gum pieces and then separating or diverging (as better shown in FIG. 5). The slanted surfaces 95A in the die grooves of the cutter ring member 90 prevent pinching of the edges or corners of the pieces of gum material which forms small pieces or "chips" of material. The formation of the chips creates a waste of gum material, and also provides small pieces of gum material which can often cause difficulties with subsequent operation of the machinery and/or formation of acceptable final products.

The elimination of the small chips from the pieces of gum materials can save up to 10–15% of waste or salvage material. Also, with center-filled gum products, the pinching and chipping could result in products with thin wall sections possibly allowing the liquid center material 28 to leak or be squeezed out of the pieces of gum material when they are compressed together by the two plunger members forming the final shape of the product. Leaking gum pieces (called "leakers") are undesirable since the leaked liquid material can cause problems in the operation of the machinery, as well as problems in the further transport and packaging of the gum pieces. Leaking formed gum products are typically unacceptable for use as commercial products. The mess and inconvenience to consumers in handling a leaking piece of center-filled gum are obvious.

Continuing with FIGS. 5 and 6, the two sets of plunger members 80 and 82 come together in the matrix ring openings 132 to form the final size and width of the gum pieces 50. This section and position is indicated by the reference numeral 140 in FIG. 6 and also shown in FIG. 8. A combination of the pressure from the plunger members and the cooled temperatures caused by the circulation of cooled air (as explained below), sets and retains the pieces of gum material in their final shapes. At this point, the pieces of gum material 50 are centered in the openings 132 in the matrix ring member 130. Thereafter, the plunger members 82 are withdrawn from the openings 132 and returned to their rest positions as shown at 142. At the same time, the plunger members 80 are extended further longitudinally (axially) such that the plunger or punch heads 118 fully push the formed pieces of gum material 50 out of the openings 132 in the matrix ring 130. This is shown in the area indicated by reference number 144 in FIGS. 5 and 6. At this point, the pieces of gum material 50 fall along support 150 and onto the conveyor 28 for transport to the cooling mechanism 30. A stripper mechanism 160 (as described in more detail below), is also provided at that point to insure that the formed pieces of gum material are removed from the die ring member 83 and thus do not continue to rotate with the die ring member nor create problems with the formation of new gum pieces from the gum rope 25.

In the preferred embodiment, a 35–80 pairs of plunger members are provided. Each die member has a pair of plunger members associated with it, one on each side thereof and in axial alignment with it (and thus with each other). The plunger members are normally biased to the retracted positions. The biased forces can be supplied by spring members 99 on the elongated shaft members, although other equivalent biasing mechanisms could be utilized. As shown in FIG. 6, the spring members are positioned between the support members and rider members.

Figures 11, 12:
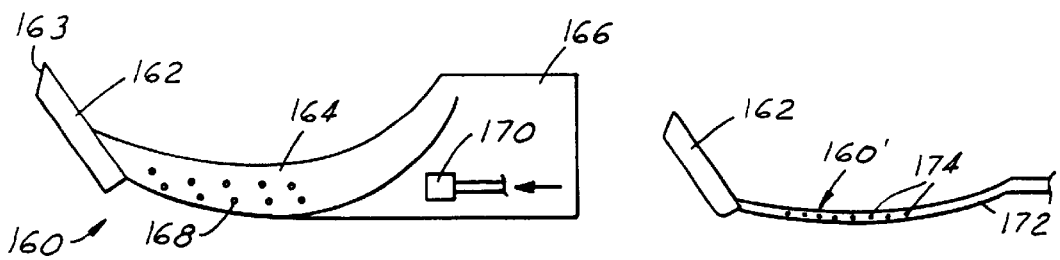
FIG. 11 illustrates a stripper mechanism in accordance with the present invention.
FIG. 12 illustrates an alternate stripper mechanism in accordance with the present invention.

The stripper member 160 is shown in more detail in FIGS. 10 and 11. The stripper member 160 has a stripper finger 162, preferably made of a plastic material, attached to a curved body member 164 which in turn is attached to a base or plate member 166. The curvature of the body member allows placement of the stripper member closely around the drum member 60. The body member 164 is preferably hollow and has a plurality of openings 168 for supply of cooled air to the die members. The cooled air is supplied through inlet 170 and passes into a chamber (not shown) in the body 164 where it is allowed to exit from openings 168. The cooled air ejected from openings 168 is directed against the two sets of die members 84 and 95 in order to keep their surfaces at a low temperature and prevent sticking of the gum material.

As shown in FIG. 10, the stripper member 160 is positioned such that the stripper finger 162 is positioned with its pointed end 163 immediately adjacent outside the openings 132 in the matrix ring 130 and the corresponding die members in the die ring 83. The stripper finger 162 insures that any formed pieces of gum material 50 which do not fall by gravity from the rotating drum member 60 are physically removed before they can interfere with formation of additional pieces of material from the gum rope 25.

The base or plate member 166 of the stripper member 160 is attached to the die forming mechanism 22 by one or more support bracket members 169 (see FIG. 4). For convenience in showing the stripper member 160 in FIG. 10, the feed chute member 60 is only partially illustrated. (Likewise, in FIG. 13, the stripper member 160 is only partially shown in order to allow full viewing of the feed chute member 60).

An alternate embodiment 160' of the stripper member is shown in FIG. 12. In this embodiment, the stripper member includes a stripper finger 162 and a tubular member 172 which has a plurality of openings 174 therein for ejection of cooled air. The stripper member of 160' can be attached to the die forming mechanism 22 in any conventional manner.

Figure 13:
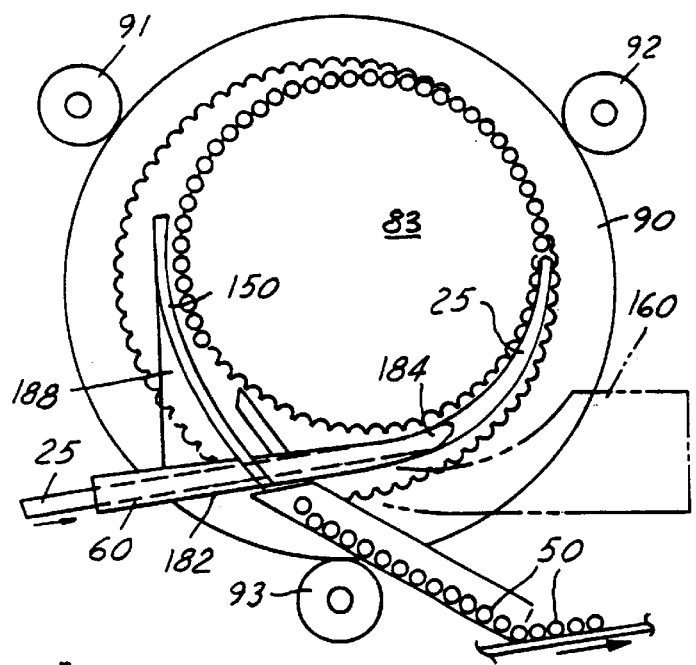
FIG. 13 is another schematic illustration of the rotating die ring and cutter ring, along with the feed chute.
Figure 14:
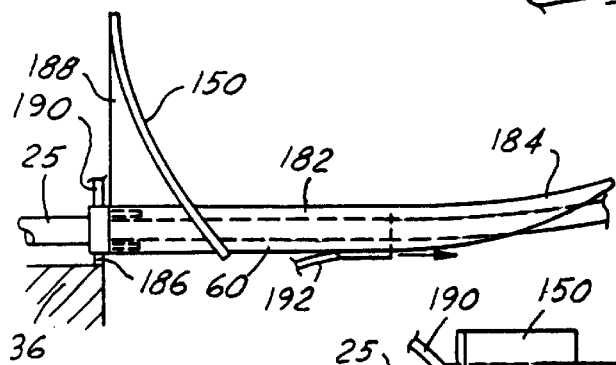
FIGS. 14, 15 and 16 are various views of a feed chute in accordance with the present invention, with FIG. 14 being a side view, FIG. 15 being a top view and FIG. 16 being a bottom view.
Figure 15:
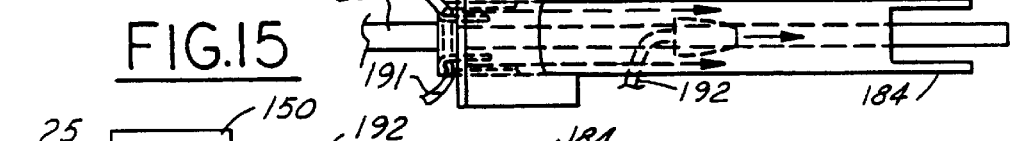
Figure 16:
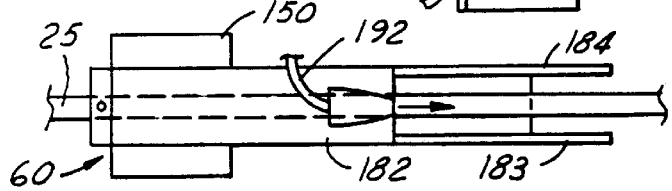

The feed chute member 60 is particularly shown in FIGS. 13–16. FIG. 13 shows the location of installation of the feed chute member relative to the rotating die ring and cutter ring members, while FIGS. 14, 15 and 16 are side, top and bottom views, respectively, of the preferred feed chute member.

The feed chute member 60 provides conveyance of the rope of gum material 25 from the forming and sizing table section 36 to the individual piece forming section on the drum member 60 in the system. Without the feed chute member 60, conveying the end of the extruded rope member 25 and inserting it into position between the diverging die half members on the die ring and cutter ring members would be difficult and time consuming. The feed chute member 60 includes an elongated housing member 182, a curved diverter plate 150 and a pair of curved guide members 183 and 184. The feed chute member 60 is positioned relative to the die ring member 82 and cutter ring member 90 as shown in FIG. 13. The housing member 182 is attached to the sizing and support table 36 by a conventional bracket member 186 or the like. A support plate 188 supports the curved diverter or deflector plate member 150 and holds the plate member 150 securely to the housing member 182 of the feed chute member 60.

The rope of gum material 25 is pulled and assisted through the feed chute member 60 by "jets" or streams of pressurized air. In this regard, pressurized air is introduced through openings 190 and 191 into opposite inside walls of the housing member 182 which act to pull along the rope of gum material 25 through the housing member 182. An additional stream or jet of air is directed along the bottom or underside of the rope of gum material through conduit 192. The pressurized air from conduit 192 "floats" and supports the rope of gum material 25 as it exits the housing member 182 and is transported to the cutting area 98 between the sets of die members.

In order to maintain the die members 84 and 95 at a cooled temperature in order to prevent the gum material from sticking to the die surfaces, cooled air is introduced and directed to the portion of the rotating drum member 60 in the gap 66 between the two portions or housing members 62 and 64. For this purpose, a pair of plate members 200 and 202 are attached to the cover or housing member 48 (see FIG. 4). The plate members are substantially parallel to one another and form a chamber or cavity 201 between them which opens along the die ring cutter ring members. The cavity 201 between the plate members 200 and 202 is filled by cooled air from conduit 204. The plate members have curved profiles adjacent the drum member 60 in order to closely align with it and direct and guide the cooling air against the die members and prevent the cooled air from escaping and cooling other parts or portions of the drum member and operating mechanism. The cooled air in chamber 201 is directed towards die ring member 82, cutter ring member 90 and their respective die members.

The cooled air is preferably supplied at temperatures below –80° F. The air can be supplied by conventional two-stage refrigerated compressed air mechanisms, although other systems can also be utilized, including the cooled gas systems.

At the same time that the gum cutting, shaping, and forming components of the rotating drum member are being cooled, other portions and components of the system and mechanism are being heated or maintained at higher temperatures so that their efficiency and performance are not adversely affected. These components particularly include the plunger members and cam mechanisms, together with their related moving components. For this purpose, inlets 210 and 220 are provided on the drum housing portions 62 and 64, respectively. The inlets 210 and 220 allow ambient or heated air to be drawn or introduced into housing portions 62 and 64. The air is exhausted through outlets 240 and 242. A compressor 230 can be used, if desired, to help circulate the air. The blanket of warmer air supplied or formed in the two drum housing portions 62 and 64 helps maintain the cam followers and airbags at normal temperatures.

The basic platform for use with the extruder mechanism 20 and gum forming mechanism 22 can be a typical candy forming machine manufactured by Bosch, Hansella, Executive, Euromec, and others. The extruder 20 can be of any conventional type. In the extrusion machine, previously processed gum material is introduced into hopper 21 and then into a single or pair of rotating screw members which massage the gum material and extrude it through a die in the form of a rope of gum material.

With the present invention, the speed of the gum forming machinery is increased, thus resulting in an increased production of gum material. As indicated, the preferred cooling material for use with the present invention is simply cooled air. With the present invention, however, the amount of cooling air or gas necessary to cool portions of the gum forming machinery and components is reduced, perhaps as much as 50%, from conventional rotating gum and candy forming systems. This is a result of subjecting only a portion of the gum forming components to a cooling process, while at the same time maintaining the temperature of other components closer to their normal operating temperatures.

In accordance with the present invention, the plunger members 80 and 82 are easier to lubricate. The operating temperatures of the plunger members are not maintained as low as with known processes, and thus the difficulties experienced with the setting or gelling of plunger lubrication (and thus problems with the resulting heat build-up and friction forces) are not significant. For example, it is unnecessary to heat oil or other fluid utilized to lubricate the movement of the plunger members. Oil provided to the present mechanism at room temperature is sufficient. With increased and more effective lubrication of the plunger members and other operating mechanisms, the inventive mechanism and system is more durable and should have a longer life.

The present invention provides a more efficient continuous manufacturing system for liquid or center-filled gum. Pieces of liquid-filled gum material are produced on a faster and more efficient process than with known processes. In this regard, it is anticipated that the capacity of the present system will be approximately double over known systems and that the system can be utilized without any additional labor expense.

The improved efficiencies of the present invention are due in part to the ease of starting of the process, the reduction in waste of gum material, the fact that breakdowns and jams are fewer and easier to clear, the fact that the gum material has minimal contact with the metal and moving members, and the fact that cooling costs are greatly reduced.

Also, with the present invention, the gum material seals around the liquid center in a better manner. This provides a better quality product with fewer leaking pieces of gum. This also results in fewer production shut-downs and less maintenance.

While particular embodiments of the invention have been shown and described, numerous variations and alternate embodiments will occur to those skilled in the art. Accordingly, it is intended that the invention be limited only in terms of the appended claims.

What is claimed is:

1. A system for continuously producing pieces of liquid-filled gum material comprising:

a rotating drum mechanism, said drum mechanism having a die ring member and a cutter ring member;

said die ring member having a first plurality of die half members;

said cutter ring member having a second plurality of die half members, one of said second plurality of die half members mating with one of said first plurality of die half members to form circular die cavities as said drum mechanism rotates;

each of said mating pairs of die half members having a pair of plunger members associated therewith for entering said mated die half members and compressing pieces of gum material positioned therein, and cam mechanisms for operating said plunger members;

a cooling chamber positioned over at least a portion of said first and second plurality of die half members, wherein cooled air substantially below ambient temperatures is supplied to said cooling chamber and directed toward said die half members in order to minimize sticking of the gum material to said die half members; and heating chambers positioned around portions of said rotating drum mechanism in which said plunger members and cam members are positioned, said heating chambers being supplied with air substantially at ambient temperatures in order to maintain the plunger members and cam members at normal operating conditions.

2. The system as set forth in claim 1 further comprising a feed chute means for introducing a rope of gum material into said first and second plurality of die half members.

3. The system as set forth in claim 2 wherein said feed chute means includes the use of compressed air to assist in the movement of the rope of gum material through the feed chute and into the rotating drum mechanism.

4. The system as set forth in claim 1 wherein said cooling chamber comprises at least a pair of plate members.

5. The system as set forth in claim 1 further comprising stripper means for assisting in the removal of pieces of formed gum material from said die groove members.

6. The system as set forth in claim 5 wherein said stripper means comprises a stripper finger positioned adjacent at least one of said first plurality die half members and a support member.

7. The system as set forth in claim 5 further comprising means for ejecting cooled gas from said stripper means onto said die half members.

8. A method of continuously producing pieces of liquid-filled gum material comprising the steps of:

supplying a rope of liquid filled gum material to a sizing member;

sizing said gum material;

introducing said sized gum material into die cavities formed between a rotating drum mechanism and a rotating cutting ring mechanism;

forming said gum material into separate pieces of sealed gum material in said die cavities by cam and plunger mechanisms;

cooling said die cavities by forming a chamber adjacent a portion of said die cavities and directing a cooling gas into said chamber;

maintaining said cam and plunger mechanism at temperatures above said die cavities by directing air at substantially ambient temperature at said cam and plunger mechanism; and removing said formed separate pieces of gum material from said cavities.

9. The method as set forth in claim 8 wherein said step of forming said separate pieces of gum material includes moving sets of cam-operated plunger members toward each other in said die cavities.

10. The method as set forth in claim 8 wherein said die cavities are formed from a plurality of die half members on said drum mechanism and a second plurality of die half members on said cutting ring mechanism.

11. The method as set forth in claim 8 wherein said step of introducing said sized gum material to said die cavities comprises using an air-assist feed chute mechanism.

12. The method as set forth in claim 8 wherein said step of removing said formed separate pieces of gum material comprises stripping said pieces with a stripper mechanism.

13. The method as set forth in claim 10 wherein said die half members on said cutting ring mechanism include slanted surfaces.

14. An apparatus for continuously producing pieces of liquid-filled gum material from a rope of liquid-filled gum material comprising:

a rotating drum mechanism, said drum mechanism comprising a first plurality of die members positioned around the periphery of said drum mechanism, a plurality of plunger members positioned adjacent said first plurality of die members, and cam members for directing said plunger members into said die members for compressing said pieces of gum material; and a rotating cutter ring mechanism, said cutter ring mechanism comprising a second plurality of die members;

said drum mechanism and said cutter ring mechanism being positioned adjacent one another such that said first plurality of die members and said second plurality of die members mate to form product shaped die cavities;

said second plurality of die members having product engaging surfaces which are slanted at an angle to the longitudinal direction of said die cavities;

wherein formation of chips of gum material from said pieces of gum material during compression is minimized.

15. The apparatus as set forth in claim 14 further comprising a cooling chamber positioned adjacent said drum mechanism and cutter ring mechanism, wherein portions of said first and second die members are cooled.

16. The apparatus as set forth in claim 14 further comprising a sizing mechanism for sizing said rope of liquid-filled gum material prior to being introduced into said rotating drum mechanism.

17. The apparatus as set forth in claim 14 wherein said plunger members are provided in pairs, one each on each end of said first plurality of die members.

18. The apparatus as set forth in claim 17 wherein said plunger members are biased by a biased member from entering said first plurality of die members.

19. The apparatus as set forth in claim 14 further comprising means for cooling said die members and means for maintaining said plunger members at temperatures greater than said die members.

20. The apparatus as set forth in claim 14 further comprising a feed tube mechanism for introducing said rope of liquid-filled gum material into said rotating drum mechanism.

21. The apparatus as set forth in claim 20 wherein said feed tube mechanism comprises means for utilizing streams of air to assist in introducing said rope of liquid-filled gum material into said rotating drum mechanism.

22. The apparatus as set forth in claim 14 comprising a stripper mechanism for assisting in the removal of pieces of gum material from said rotating drum mechanism.

23. The apparatus as set forth in claim 22 wherein said stripper mechanism includes means for directing cooling air towards a portion of said die members.

24. The apparatus as set forth in claim 14 wherein said rotating drum mechanism is positioned on a shaft member and further comprising heating means for supplying heat to said shaft member.

* * * * *